United States Patent [19]

Gunn

[11] Patent Number: 4,967,673
[45] Date of Patent: Nov. 6, 1990

[54] COUNTERFLOW MILD GASIFICATION PROCESS AND APPARATUS

[76] Inventor: Robert D. Gunn, 5905 Bill NYE, Laramie, Wyo. 82070

[21] Appl. No.: 285,503

[22] Filed: Dec. 16, 1988

[51] Int. Cl.$^5$ .............................................. F23G 5/12
[52] U.S. Cl. ..................................... 110/346; 110/229; 110/188
[58] Field of Search ............... 110/346, 235, 242, 255, 110/259, 110, 229, 230, 188

[56] References Cited

U.S. PATENT DOCUMENTS

| | | | |
|---|---|---|---|
| 1,101,925 | 6/1914 | Harris | 122/2 |
| 3,699,903 | 10/1972 | King | 110/347 |
| 3,777,676 | 12/1973 | Lagen | 110/255 |
| 4,052,168 | 10/1977 | Koppelman | 44/1 G |
| 4,069,107 | 1/1978 | Kopelman et al. | 201/12 |
| 4,106,999 | 8/1978 | Koppelman et al. | 202/118 |
| 4,126,519 | 11/1978 | Murray | 201/32 |
| 4,127,391 | 11/1978 | Koppelman | 44/51 |
| 4,129,420 | 12/1978 | Koppelman | 44/51 |
| 4,330,032 | 5/1982 | Koppelman et al. | 165/94 |
| 4,423,688 | 1/1984 | Kuo | 110/110 |
| 4,477,257 | 10/1984 | Koppelman et al. | 44/30 |
| 4,498,909 | 2/1985 | Milner et al. | 110/229 |
| 4,579,067 | 4/1986 | Peters | 110/235 |
| 4,584,947 | 4/1986 | Chittick | 110/229 |
| 4,626,258 | 12/1986 | Koppelman | 44/2 |
| 4,664,678 | 5/1987 | Rehmat et al. | 110/259 |
| 4,732,091 | 3/1988 | Gould | 110/229 |
| 4,823,742 | 4/1989 | Davis et al. | 110/229 |

OTHER PUBLICATIONS

"Upgrading Pow(d)er River Coal to K-Fuel for Shipment", by Russell C. Phillips and Robert G. Murray, as presented at American Mining Convention, Phoenix, Arizona, Sep. 26, 1984.

"Design of Fort Union K-Fuel Facility", by Russell C. Phillips, Nicholas G. Zervos, Robert G. Murray, Rudd F. Elbrech and Edward Koppelman, American Institute of Chemical Engineers, Houston, TX.

"LFC Process Description", SGI International, Undated.

"Coal Conversion Technology: Opportunities and Challenges", May by T. Y. Yan, *Energy*, vol. II, No. 11/12, pp. 1239–1247, May 1986.

"A Moving Bed Gasifies Coal More Effectively than Fixed and Fluidized Beds", an abstract from *Chemical Engineering*, Aug. 18, 1986.

Stanley Manahan, "Sorption Incineration of Chlorinated Hydrocarbons Acid, Heavy Metals, and Excess Nutrients in Water Using Coal-Derived Solids," Dec. 31, 1982 (the Manahan Report).

*Primary Examiner*—Edward G. Favors
*Assistant Examiner*—Denise L. Ferensic
*Attorney, Agent, or Firm*—James R. Young

[57] ABSTRACT

This counterflow mild gasification process and apparatus utilizes reverse or counterflow combustion to pyrolyze or dry and gasify a carbonaceous reactant, such as a solid fossil fuel or solid biological waste. The solid carbonaceous material fills an elongated combustion chamber where it is ignited to create an advancing combustion front. An oxidant is introduced such that it flows in a direction opposite the advance of the combustion front. The system temperature and velocity of combustion front are controlled by pressure, the purity of the oxidant, and the moisture content of the carbonaceous reactant, as well as by the inlet temperature and flow rate of the oxidant and the initial bed temperature of the carbonaceous reactant. For example, either increasing the pressure, increasing the purity of the oxidant, or decreasing the moisture content of the carbonaceous reactant reduces the system temperature of the combustion chamber and increases the combustion front velocity to result in higher quality end product gases, including hydrocarbons and methane.

46 Claims, 2 Drawing Sheets

COUNTERFLOW MILD GASIFICATION PROCESS AND APPARATUS

BACKGROUND OF THE INVENTION

1. Field of the Invention

The present invention is broadly applicable to the processing of carbonaceous feed material to effect desirable chemical and physical changes, usually through elevated temperatures and increased pressures. More specifically, this invention relates to the drying and/or gasification of solid fossil fuels and solid biological wastes by thermal restructuring or pyrolization to produce usable solids as well as gaseous and/or liquid byproducts. Additionally, this invention relates to contaminated soil sterilization through the oxidation of organic toxins, and to the devolitilization and oxidation of toxins absorbed on spent beds of activated carbon or other materials, including inorganic adsorbents.

2. Description of the Prior Art

The fuel shortages of the mid-1970's and the projection of future shortages of such conventional energy sources as gas and oil have given rise to investigations into alternative energy sources, including solid fossil fuels, such as oil shales, brown coals, lignites, subbituminous coals and the like, and solid biological wastes, such as wood chips, saw dust, peat, sewage sludge and other carbonaceous sludges, bagasse, hulls, straw, cornstalks and the like.

Although this present invention applies to both solid fossil fuels and solid biological wastes, most of the relevant discussions in the prior art deals with coal conversion. For example, a summary of coal conversion is provided in "Coal Conversion Technology: Opportunities and Challenges", Energy, Volume II, Number 11/12, pages 1239-1247, 1986, by T. Y. Yan. In general, coal conversion processes fall into four groups: desulfurization, liquification, carbonization, and gasification. Desulfurization, which for most coals is only marginally achieved by this invention, is usually accomplished by chemical leaching. Liquification has been accomplished by mixing crushed coal with oil (often process derived) into a slurry and then reacting it with hydrogen under increased temperatures and pressures. Carbonization, or coal drying, which has traditionally been accomplished in the absence of air or other oxidants, involves a boiling away of the moisture contained within the coal, a thermal restructuring of the coal into a char, and the generation of gaseous and liquid by-products. In gasification, coal is reacted with oxygen and/or steam at increased temperatures and elevated pressures to form gaseous mixtures of hydrogen, carbon monoxide, and carbon dioxide.

Typical of current technology in coal drying are several of the prior art patents of Koppelman, including U.S. Pat. No. 4,052,168 and its two continuations-in-part, U.S. Pat. Nos. 4,127,391 and 4,129,420. The parent U.S. Pat. No. 4,052,168 describes a process for upgrading lignite-type coal by a batch autoclave treatment at elevated temperatures and increased pressure to effect a thermal restructuring of the coal and to generate a gaseous byproduct. The first continuation-in-part, U.S. Pat. No. 4,127,391, utilizes this autoclave treatment for agglomerating bituminous fines into useful low-sulfur fuel. The second continuation-in-part, U.S. Pat. No. 4,129,420, generates coke by heating cellulosic materials in the autoclave.

Other Koppelman patents that are typical of current technology in gasification include: U.S. Pat. No. 4,069,107, and its continuation-in-part U.S. Pat. No. 4,106,999. These two patents describe a process of continuous pyrolyzing particulated carbonaceous feed material in which preheated pebbles are mixed with the carbonaceous feed to form a downwardly moving columnar reaction mass. These two patents further describe the introduction of an oxidant into a cylindrical reaction chamber through pores in a concentric annular wall within the chamber.

Other prior art patents of interest include Murray, U.S. Pat. No. 4,126,519, and two other Koppelman patents, U.S. Pat. Nos. 4,477,257 and 4,626,258, all of which describe a countercurrent flow of the gaseous by-product, not the oxidant, to preheat the feed materials in their pyrolysis drying methods. U.S. Pat. No. 4,126,519 discloses a continuous drying method utilizing contiguous chambers for preheating and thermal reacting the feed material. U.S. Pat. No. 4,477,257 also shows a continuous drying method, in which the process is performed in pre-heating, pressurized dewatering and reaction stages with a separate chamber for each stage. The last of these patents U.S. Pat. No. 4,626,258, which also teaches a continuous process utilizing a multiple hearth reactor that contains a plurality of annular hearths.

The above-described prior art processes and other current methods of coal drying and gasification are characterized by slow and difficult transfer of heat from the heat source into the interior of the coal particles, thus resulting in slow and inefficient means for boiling moisture from the coil. One approach, called low temperature drying, has partially overcome this slow heat transfer problem by placing the coal in intimate contact with a drying gas, thereby creating a turbulent, fluidized bed. Disadvantages of this turbulent, fluidized bed approach include difficulties in controlling the fluidized beds, a narrow, confining range of operating conditions, and large equipment investments that afford only marginal economic returns. The most severe disadvantage, however, is that low temperature drying methods typically generate pyrophoric dried coal, which ignites spontaneously when exposed to air. Consequently, such pyrophoric dried coal product requires chemical treatment at added expense before it can be transported, handled, or stored.

An additional persistent problem with current coal drying and gasification methods is the production of waste products, such as tar and ash. These waste products create special handling and disposal problems, the solutions of which can significantly increase costs.

SUMMARY OF THE INVENTION

Accordingly, it is a general object of this invention to provide a rapid, inexpensive method and apparatus for the drying of coal and other organic material, as well as the production of gas and liquids. An additional general objective of this invention is to provide a rapid, inexpensive method and apparatus for sterilizing contaminated soils by burning off the organic constituents and for regenerating adsorbent beds containing combustible adsorbates.

Another object of this invention is to allow lower drying temperatures while still maintaining high drying rates and thereby providing higher output capabilities for a given size of equipment as well as a lower consumption of the oxidant resulting in more favorable economics.

A more specific object of this invention is to provide a combustion process having improved temperature and combustion control for milder system temperature and more rapid combustion, thus better product generation efficiency and quality control than has been available before this invention.

A further object of the present invention is to provide a method and apparatus for producing a gas product from solid carbonaceous materials that is of substantially higher quality than than gas products produced in other drying or gasification processes.

It is also an object of the present invention to produce a much wider range of product gases than presently achieved with other drying or gasification processes.

It is a still further object of the present invention to provide a drying or gasification process for coal and other organic materials that produces very little, if any, tar and ash.

Additional objects, advantages and novel features of the present invention are set forth in the description that follows and in part will become apparent to those skilled in the art upon examination of this disclosure or may be learned by the practice of this invention. The objects and the advantages of the invention may be realized and attained by means of the instrumentalities and in combinations particularly pointed out in the appended claims.

To achieve the foregoing and other objects and in accordance with the purpose of the present invention, as embodied and broadly described herein, the counterflow mild gasification apparatus of this invention may comprise an elongated combustion chamber filled with solid carbonaceous feed materials. An ignition device for igniting the solid carbonaceous material and a fluid outlet port are positioned near one end of the combustion chamber and an inlet for a fluid oxidant, usually air or pure oxygen, is positioned at the other end of the chamber. Appropriate fill apparatus, valves, and solid product removal apparatus can be provided for batch processing. Alternatively, continuous feed apparatus, such as an auger extending partially through the chamber, can be provided for advancing feed material through the chamber at a rate necessary to maintain the combustion front relatively stationary in the chamber.

The process of this invention includes igniting a combustion zone in a carbonaceous material in the chamber, flowing oxidant through the chamber in a direction opposite to the progress of the combustion zone, and regulating the combustion temperature and velocity of the front of the combustion zone in relation to the carbonaceous feed material by varying the purity of the oxidant, the pressure in the chamber, or the moisture in the feed material. According to the process of this invention, increasing oxidant purity, increasing pressure, and decreasing moisture all increase velocity of the combustion front and decrease the system temperature in the combustion chamber, while decreasing oxidant purity, decreasing pressure, and increasing moisture all decrease velocity of the combustion front and increase system temperature in the combustion chamber.

The reverse flow of the oxidants allows only a partial combustion of the solid carbonaceous material. The oxidant flow may be continuous or periodic and may further be pressurized from 0 psia to 5000 psia, but it typically ranges from 1 psia to 600 psia. Depending upon the nature and type of the solid carbonaceous material, this combustion may occur from 400° F. up to 3000° F., but preferably and typically occurs in the range of 600° F. to 1500° F. In a batch process, the combustion of the carbonaceous material begins at the ignition end and progresses through the chamber toward the other end. A high quality hydrocarbon gaseous product, which is the result of the interaction of the oxidant with the combusting or oxidizing carbonaceous material is retrieved from the fluid outlet port at the ignition end of the chamber. A further product of the counterflow mild gasification process is partially combusted, solid, carbonaceous material, which can be a char, coke, or upgraded coal, depending upon the nature and type of carbonaceous feed material used and operating conditions.

The process of this invention can also be operated as a continuous process in which the char, coke, or upgraded coal is removed from the ignition end of the combustion chamber continuously or periodically by gravity or by mechanical means, such as an augur or rotary screw conveyor, as the solid carbonaceous feed material is added simultaneously from the other end of the reaction chamber. The addition of the carbonaceous feed material may likewise be continuous or periodic, by gravity or by some mechanical means such as an augur or rotary screw conveyor.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENTS

Figure 1:
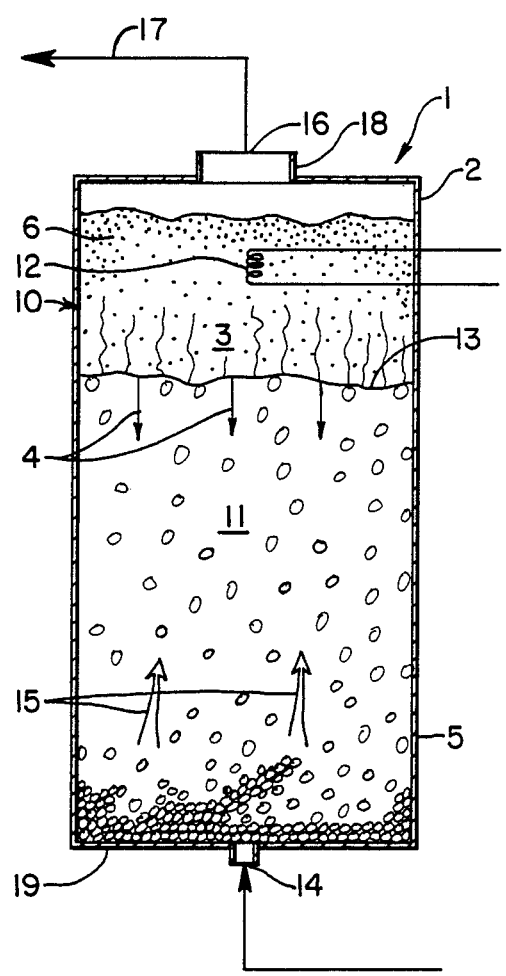
FIG. 1 shows a schematic layout of the batch, counterflow mild gasification process in accordance with the preferred embodiment of the present invention.

A batch process apparatus 1 for the present invention, as shown in FIG. 1, can include an elongated combustion chamber 10, an igniter 12 near one end of the chamber 10, an inlet 14 at the other end of the chamber 10, and a gas product outlet 17 at the end of the chamber 10 that is adjacent the igniter 12. Batch combustion chamber 10, as shown in FIG. 1, is filled with a primarily solid, feed material 11 comprising volatile matter that is to be dried, gasified, or sterilized. Combustion chamber 10 is sealed and may additionally be pressurized. Solid feed material 11 contains a carbonaceous reactant, which may be a solid fossil fuel, such as oil shale, brown coal, lignite, subbituminous coal or the like; or may be solid biological wastes, such as wood chips, saw dust, peat, sewage sludge or other carbonaceous sludge, bagasse, hulls, straw, cornstalks, or the like; or may further be, soil or absorbent beds contaminated with organic toxins and other toxins which can effectively be neutralized through burning. A catalytic material, such as an alumina supported catalyst, or a purely inert material to aid in heat distribution, such as ceramic berl saddles can be mixed with the carbonaceous feed material if desired. The addition of an appropriate catalyst can enhance reactivity or selectivity, while other appropriate catalysts can suppress undesired reactions. Such catalysts are known to persons skilled in this art and, as such, do not constitute a part of this invention, other than as they can be used in combination with this invention.

Prior to the introduction of feed material 11 into chamber 10, feed material 11 may be pre-dried. Such predrying may be by any methods commonly known in the industry, including sun drying, air drying, or squeeze drying. Predrying is useful when feed material 11 is a high moisture content coal or high moisture biological waste. With certain of the higher moisture content biological wastes, such as peat and sludge, some form of pre-drying may be a necessity. Peat and sludge can have up to 80 to 90% moisture contents, which results in a negative heating value for the material. Accordingly, unless these higher moisture content feed materials, such as peat or sludge, are predried, combustion in chamber 10 may be impossible.

An ignition device 12, such as an electric coil igniter or other suitable ignition device, is positioned near one end 2 of the chamber 10. The ignition coil 12 ignites certain volatile matter within feed material 11, thereby creating a combustion zone 3 with a combustion front 13, which moves away from the ignition coil 12 as indicated by the arrows 4. Igniting the feed material 11 and causing it to burn generates a great deal of heat. Such heat at the combustion front 13 places the heat for drying at the particle level, instead of at the system level as would be the case with some form of external heating. Heating at the particle level, wherein the feed material 11 heats itself, is far more efficient than trying to transfer external heat to the interior of a conglomeration of feed material 11. Although temperature will be primarily a function of the type of volatile material contained within feed material 11, and certain other factors as will be discussed below, having the feed material dry or at least partially dried itself, a much shorter drying period by the heat of combustion and, accordingly, a much lower system temperature due to faster combustion front 13 advance will result for the reasons discussed below. The converse of higher moisture content of the feed material 11 resulting in slower combustion front 13 advance and higher system temperature is the logical corollary according to the reasons described below.

An inlet port 14 at the other end 5 of combustion chamber 10, opposite ignition coil 12, is provided for injecting an oxidant 15 into chamber 10. This oxidant 15 may be, for example, pure oxygen, a mixture of oxygen and air, or just plain air. The oxidant 15, which may be pressurized, flows through the feed material 11 toward the advancing combustion front 13. This flow of oxidant 15 in a direction opposite the direction 4 of the advancing combustion front 13 in combination with the milder temperature discussed below gives rise to the name of this process, Counterflow Mild Gasification Process. As will be shown in the examples below, pressurizing oxidant 15 and having it flow in a direction opposite the direction 4 of the advancing combustion front 13 reduces oxidant consumption by as much as half over what other commercial coal gasification processes consume.

The peak temperature range within combustion chamber 10 is from about 400° F. to 3000° F. and is preferably in the range of about 600° F. to 1500° F. when carbonaceous material 11 is a subbituminour or lignite-type coal typical of those found in Montana and Wyoming. These temperature ranges are milder than the 1500° F. to 3000° F. typical of other conventional coal gasification processes. The specific temperatures involved will vary depending upon the nature and type of solid reactant 11 and oxidant 15.

Much to this inventor's surprise, utilizing oxygen, instead of air, as the oxidant increases the reaction rate and decreases the system temperature. The reason for this surprising phenomenon is a little complicated. Combustion by oxygen and air result in similar levels of heat released at the combustion front 13. However, this heat of combustion is carried back through combustion zone 3 by convection as the oxidant flows in a direction opposite the advance of front 13. Consequently, the only way for temperature to increase ahead of combustion front 13 is by conduction and radiation. The amount of suet preheating of feed material 11 ahead of combustion front 13 by conduction and radiation is controlled by how quickly combustion front 13 advances. A faster advancing combustion front 13 results in less preheating of feed material 11 ahead of the combustion front 13, because transfer of heat through the feed material 11 by radiation and conduction is a relatively slow process. A faster advancing combustion front 13 reaches new feed material 11 before such new feed material 11 has had much of a chance to be heated by radiation and conduction. Oxygen, being a purer oxidant than air, allows for a more rapid reaction rate resulting in a quicker advance of combustion front 13. The reaction rate with pure oxygen, as measured by the advance of front 13, was found to be 7 to 20 times faster than the reaction rate with air. This quicker advance of front 13 leads to greater levels of output and significantly lower total system temperatures.

Of course, when figuring the economics of production, the quantity of oxygen, which costs more than air, must be weighed against the increased output in calculating the costs of production. Still, this present invention achieves significantly lower temperatures and faster reaction rates than other conventional coal drying and/or gasification processes. This feature of the Counterflow Mild Gasification Process, whereby system temperature and reaction rate can be manipulated by adjusting the oxidant, also allows for a much wider range of products. As will be discussed below, an additional feature with this counterflow process is that system temperature, reaction rate, and the end products can also be manipulated by the inlet temperature, pressure, composition, and flow rate of the oxidant.

An outlet port 16 for draining off product gas 17 is located at the ignition end 2 of chamber 10, opposite the inlet port 14. The gas 17 is a product of the reaction of oxidant 15 with the combusting (oxidizing) material 11. Pressurization of chamber 10 can be achieved by a pressure control valve or regulator 18 attached at outlet port 16. Accordingly, the pressure in chamber 10 is a back pressure resulting from restriction of the oxidant gas flow. Product gas 17 contains both the liquid components and gaseous components of the end-products. Due to the high temperature of combustion in chamber 10, the components of gas 17 which are normally liquids at temperatures nearer room temperature, are removed in their gaseous state along with the normal gaseous components in product gas 17. Once removed, product gas 17 may be cooled in a condensation chamber (not shown) to separate the liquid components from the gaseous components.

Product gas 17 is composed of a wide range of constituents, including hydrocarbons, carbon dioxide, carbon monoxide, and hydrogen. Heretofore, gasification processes have tended to produce a predominance of carbon monoxide, hydrogen, and water vapor which has limited economic value, being utilized chiefly as a pre-heating agent in the same gasification process which generated it or in conjunction with ammonia plants. However, in this present process, by varying operating conditions, i.e., temperature, pressure, and type of oxidant, up to 80% or more of the heating value of product gas 17 can be as methane, oil and other valuable hydrocarbons on a carbon dioxide-water free basis. Methane and other hydrocarbons tend to be more marketable. Using air as an oxidant tends to discourage production of oil in product gas 17. Air tending to allow higher temperatures, as discussed above, burns off the oil. Oxygen, on the other hand, tends to favor the production of oil as the lower temperatures tend to burn a smaller amount of fuel. By the same token, lower temperatures also favor methane production, while higher temperatures tend to favor carbon monoxide and hydrogen production.

In certain applications of this counterflow process, it will be desirable to obtain a complete combustion of the feed material 11. If feed material 11 is a soil or adsorbent bed comprising organic and other volatile toxins, then it would be desirable to completely burn off the toxins. Likewise, if feed material 11 is a biological waste whose chief economic value in being processed lies in the gaseous and liquid end-products 17, it may be desirable to have a complete or almost complete combustion of the volatile matter. However, if feed material 11 is coal, and in addition to the high quality gas product 17 it is desired to obtain a high quality solid product 6, then complete combustion of the coal is undesirable. Solid product 6 is the thermal restructured material that remains behind the combustion front 13. One of the significant advantages of having the oxidant 15 flow in a direction reverse to the advance of combustion front 13 is that it allows greater control over the level of combustion achieved. With the partial combustion feature of this counterflow process as much as 95% of all volatile material within feed material 11 can remain unburned. Partial combustion, as is preferable with coal drying, can be achieved through this reverse flow of oxidant by manipulation of the inlet temperature and by the type, quantity and pressure of the oxidant. The preferred conditions for partial combustion are decreased flow rate of oxidant (oxidant lean); use of oxygen as the oxidant (more pure), lower temperature, and increased pressure. Conversely, the preferred conditions for complete combustion are increased flow rate of oxidant (oxidant rich), use of air as the oxidant (less pure), higher temperatures and decreased pressure flow rate. However, the factor which seems to have the greatest influence over the level of combustion achieved is the quantity of the oxidant used. This makes sense, because in the oxidant lean state, which favors partial combustion, there simply is not sufficient oxidant to achieve a complete oxidation or combustion of feed material 11.

In the case of coal, partial combustion of material 11 results in a chemical and thermal restructing of material 11 into product 6 characterized as char, coke, or upgraded coal, depending upon the operating conditions and the type and nature of material 11 which is used as feed. As shown in the examples below, this partial combustion feature of the counterflow process results in a solid product 6 of greater quality than has been obtainable heretofore in comparable industrial processes.

The pressurized flow of the oxidant 15 within the combustion chamber 10 can be in the range from 0 psia to 5,000 psi, and it is preferably in the range of about 0 psia to 600 psia. The specific pressures will vary depending both upon the nature and type of feed material 11 used in combustion chamber 10 and upon the desired quality and quantity of gas product 17. Higher pressures tend to favor production of more oil and methane, which are more stable at these higher pressures. This is due to a shift with pressure of the thermodynamic equilibrium between carbon, hydrogen and carbon oxides on the one hand and oil and methane on the other hand. However, the equipment necessary to handle higher pressures can be very expensive, and even cost prohibitive. In addition to which, in this batch process, every time chamber 10 is emptied or filled, pressure is lost and it requires repressuration for each subsequent combustion cycle. Accordingly, the decision as to what kinds of pressure to employ in production, often resolves to economics as opposed to the desirability of a given end-product. But, as discussed above, selection of specific end-products can also be made by manipulation of the nature and quantity of oxidant 15 used on a particular feed material 11.

Batch combustion chamber 10 has a bottom 19, which may be constructed in such a manner that it is capable of being opened by being swung or slid out of the way. Then when combustion front 13 has reached bottom 19, thereby completing the thermal restructioning of all the feed material 11 into combusted, or partially combusted, material 6, bottom 19 may be opened releasing material 6 into some receiving apparatus (not shown), such as a hopper.

Combustion chamber 10 in FIG. 1 is illustrated in a vertical position; however, it may be operated at any angle, including horizontal. Further the ignition from ignition coil 12 can be from the top, from the bottom, or from either side, so long as it is opposite inlet ports 14 for the oxydizing agent 15.

The feature of this counterflow mild gasification process, where the oxidant flow 15 is in a direction opposite the advance of the combustion front 13 and combustion zone 3, is not limited to a batch process, but is also applicable to a continuous process. Such a continuous process may for example be utilized with gravity feed apparatus 101 such as shown in FIG. 2, or with an auger feed apparatus 201 such as that shown in FIG. 3.

Figure 2:
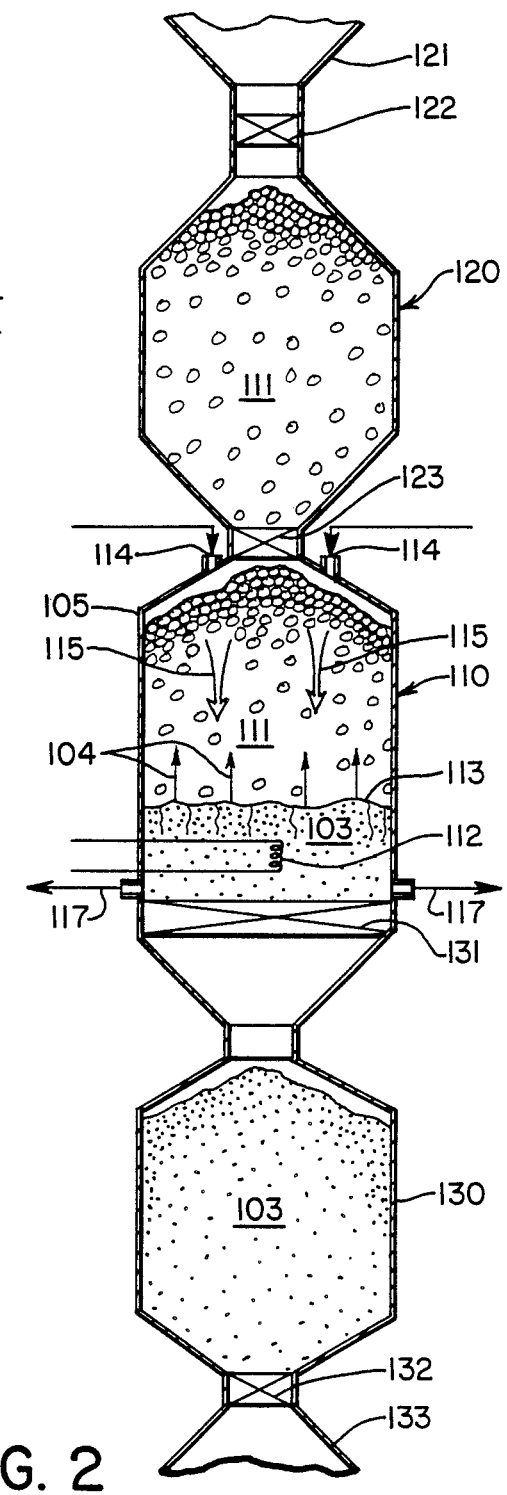
FIG. 2 shows a schematic of an intermittent, gravity feed counterflow mild gasification process according to this invention.

Referring now to FIG. 2, a primarily solid carbonaceous feed material 111, is fed into valved storage tank 120 by a receiving chute 121 and through a valve 122. Valve 122, which is positioned between the chute 121 and the storage tank 120, can be a high pressure valve for holding a pressure differential when a pressurized oxidation process is used. When storage tank 120 has been filled with feed material 111, valve 122 can be closed. Feed 111 can then be emptied into combustion chamber 110 by opening a valve 123 between the storage tank 120 and the chamber 110. Valve 123 can also be a high pressure valve so that pressure can be maintained in chamber 110 when valve 122 is opened to fill the storage tank 120, as described above. When the combustion chamber 110 is completely filled or when storage tank 120 has emptied, valve 123 can be closed. If it is desired to pressurize chamber 110, the pressure can be maintained by alternating the opening and closing of high pressured valves 122 and 123 such that they are not both open at the same time.

In the initial start-up of the continuous process illustrated in FIG. 2, an ignition device 112 located at or near the bottom of combustion chamber 110 is activated to ignite the solid feed material 111, thereby creating a combustion zone 103, which defines a combustion front 113 at its leading edge. Combustion front 113 advances upwardly in the direction indicated by arrow 104 away from ignition device 112 and through chamber 110.

An inlet port 114 is located at the top end 105 of combustion chamber 110 for flowing the oxidant 115 into chamber 110. As in the batch process described above, oxidant 115 may be air, pure oxygen or a mixture of the two. An outlet port 116 is located at the bottom end 102 of chamber 110 for drawing off the gaseous product 117. The location of the inlet and outlet ports 114, 116, respectively, define an oxidant flow that is in a direction opposite the movement of combustion front 113. ;.s in the batch process described above, this reverse flow of the oxidant 115 in the continuous process allows for only a partial combustion of the solid carbonaceous material 111.

Once the combustion front 113 has moved upward a substantial distance, such as in the range of about 50 to 75 percent of the length of chamber 110, a valve 131 at the bottom of chamber 110 can be opened to allow the solid, partially combusted carbonaceous material 106 to fall into a storage tank 130. When about 25 to 50 percent of the solid combusted product has been removed from chamber 110, valve 131 can be closed. Another valve 132 at the bottom of storage tank 130 can be opened to empty the storage tank 130 through outlet chute 133 as desired. Valves 131 and 132 can be high pressure valves. Again, if it is desired to maintain pressure in chamber 110, this can be achieved by alternating the opening and closing of high pressure valves 131 and 132 such that they are never open at the same time.

The flow of oxidant 115 and the related gaseous product removal 117, may be continuous or periodic. Periodic flow affords a temporary halt during the emptying and filling of combustion chamber 110.

This continuous process does not necessarily have to be gravity fed. Rather, it can be driven by some mechanical means, such as rotary screw conveyors or an augers, as shown in the mechanical-driven, continuous feed apparatus 201 illustrated in FIG. 3. A primarily solid carbonaceous feed material 211 is fed into a valved storage tank 220 by a receiving chute 221 and through a valve 222. Valve 222 may be a high pressure valve so that once storage tank 220 has been filled with solid feed material 211, valve 222 may be closed to maintain a pressure in storage tank 220.

Solid feed 211 is transferred from storage tank 220 to a combustion chamber 210 by way of a conveyance tube 224 with an auger 225 rotatably positioned therein. A valve 223, which may be a high pressure valve, is located at the bottom of storage valve 220 and allows the transfer of the solid feed 211 into tube 224. Alternating the opening and closing of high pressure valves 222 and 223 allows the operator to maintain pressurization of combustion chamber 210.

Auger 225 in tube 224 is driven by a drive motor 226. Such augers and drive motors are commonly known to persons skilled in the art. The rotating motion of auger 224 moves the solid feed 211 along its length, depositing feed 211 into one end 105 of chamber 210.

Combustion chamber 210 is also fitted with a large diameter auger 218, which is driven by a drive motor 219. The rotating motion of auger 218 transfers the solid feed material 211 along the length of chamber 210 in a direction toward an outlet conveyance tube 234 positioned at the other end 202 of chamber 210. At or near outlet end of chamber 210 is an ignition device 212, which when activated ignites the solid carbonaceous feed material 211 in chamber 210. Igniting feed material 211 causes combustion of the feed material 211 creating a combustion zone 203 defined by combustion front 213. Combustion front 213 will tend to advance in a direction away from the ignition device 212, as indicated by arrows 204. However, the actual direction that combustion front 213 moves depends on the speed of feed material 211 through chamber 210, as controlled by auger 218. Ideally the auger 218 is operated at a speed that moves the feed material 211 toward end 202 at the same rate as the combustion front 213 advances into the uncombusted feed material 211, thereby effectively keeping the combustion front 213 and combustion zone 203 stationary at about the midpoint along the length of chamber 210.

At the solid material inlet end 205 of chamber 210 is an inlet port 214 for injecting the oxidant 215 into chamber 210. At the ignition end 202 of chamber 210 is an outlet port 216 for removing the gaseous product 217 from the chamber 210. Accordingly, oxidant 215 flows through the feed material 211 in a direction that is opposite the direction that combustion front 213 would progress if the auger 218 was stationary.

At the ignition end 202 of chamber 210, auger 218 deposits the now partially combusted material 206, which may be char, coke, or upgraded coal, into a conveyance tube 234, which can contain an auger 235 rotated by a drive motor 236. Auger 235 propels the partially combusted material 206 out of chamber 210 along the length of tube 234, finally depositing material 206 into a receiving tube or area 237, which empties into a valved storage tank 230 through an open valve 231, which can be a high pressure valve. Likewise, storage tank 230 may be emptied of combusted material 211 through an outlet chute 233 by way of a valve 232, which may also be a high pressure valve. By alternating the opening of high pressure valves 231 and 232, an operator can maintain the pressurized environment in chamber 210. In a continuous operating mode, the receiving tube 237 would have to have sufficient capacity to hold the partially combusted material 206 produced in chamber 210 while valve 231 is closed long enough to empty storage tank 230 with valve 232 open, or some other alternate storage area (not shown) would have to be provided.

Figure 3:
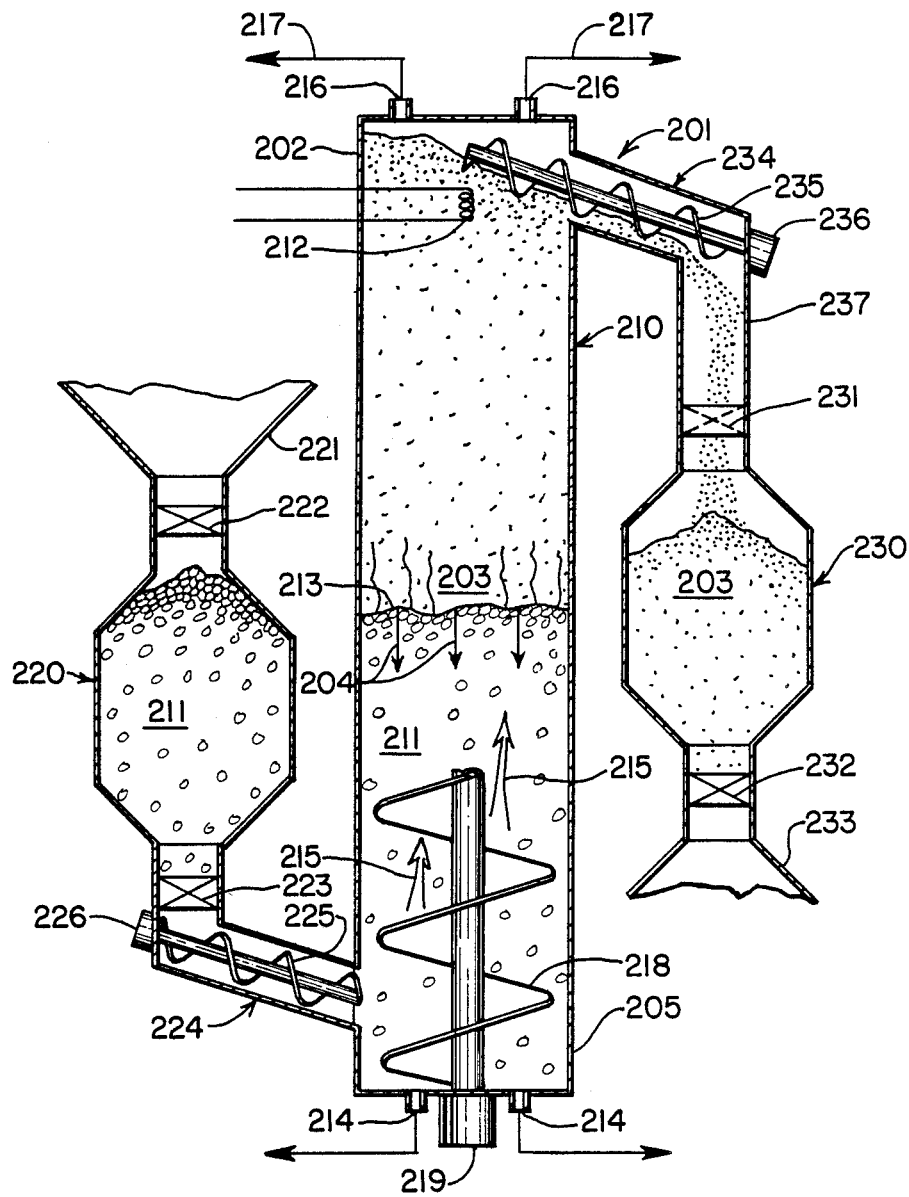
FIG. 3 shows a schematic of the continuous auger feed counterflow mild gasification process according to this invention.

As described herein, and as shown in FIG. 3, valved storage tanks 220 and 230 depend upon gravity in the filling and emptying cycles and accordingly have a vertical orientation. However, valved storage tanks 220 and 230 may be fitted with augers or similar propelling devices, when it is desired to have their orientation other than vertical. Similarly, chamber 210, which in this embodiment is fitted with augur 218, is not restricted to the vertical orientation depicted in FIG. 3.

Numerous test runs have been made according to this invention using subbituminous coals, found typically in the western United States, in a batch process as described above in the preferred embodiment and shown in FIG. 1. Several of these test runs are described in the examples below. Although these examples deal specifically with subbituminous coals, this process is equally applicable to other solid fossil fuels and solid biological wastes. These examples are for illustrative purposes only and are not intended to limit the scope of the invention as herein described or as set forth in the appended claims.

EXAMPLE I

A subbituminous C coal from the Powder River Basin of Wyoming was treated with a batch process. An analysis of the raw coal was as follows:

TABLE I-1

| COAL ANALYSIS (Weight %) | |
| --- | --- |
| Moisture | 39.48% |
| Ash | 4.67% |
| Volatile Matter | 30.33% |
| Fixed Carbon | 30.52% |
| Total | 100.00% |

Heating Valve - 7839 Btu/lb

This first test run was conducted at or near optimum operating conditions for this type of coal, as shown in Table I-2 below. Of course, optimum operating conditions will vary from seam to seam and from mine to mine. The operating conditions used in this example are as follows:

TABLE I-2

| OPERATING CONDITIONS | |
| --- | --- |
| Pressure | 80–100 psi |
| Peak Temperature | 1490° F. |
| Oxidant | pure $O_2$ |
| Oxidant Inlet flux | 117 Lb/ft$^2$ hr |
| Combustion Front Velocity | 21.7 feet/hour |
| Particle Size | ¼ inch minus |

The following Tables I-3, I-4, and I-5 analyses of the processed solid coal or char, the gaseous product, and a material balance which resulted from this first test run.

TABLE I-3

| CHAR ANALYSIS (Weight %) | |
| --- | --- |
| Moisture | 5.08% |
| Ash | 9.64% |
| Volatile Matter | 26.76% |
| Fixed Carbon | 58.52% |
| Total | 100.00% |

Heating Valve - 11766 Btu/lb

TABLE I-4

| GAS ANALYSIS (Mole %) | |
| --- | --- |
| $H_2$ | 12.2% |
| CO | 20.9% |
| $CO_2$ | 59.5% |
| $CH_4$ | 5.9% |
| $C_2$'s | 1.2% |
| $C_3$'s | 0.3% |
| Total | 100.0% |

Heating Valve - 195 Btu/scf

TABLE I-5

| MATERIAL BALANCE | | | |
| --- | --- | --- | --- |
| | Entering (Lbs) | Leaving (Lbs) | % Difference |
| Coal/Char | 41.8 | 21.9 | |
| Gas | 4.9($O_2$) | 9.9 | |
| Liquid | 0.0 | 15.1 | |

TABLE I-5-continued

| MATERIAL BALANCE | | | |
| --- | --- | --- | --- |
| | Entering (Lbs) | Leaving (Lbs) | % Difference |
| Total | 46.7 | 46.9 | +0.4% |

Thermal Efficiency 85%

EXAMPLE II

A subbituminous coal of the WyoDak type was treated with a batch process. An analysis of the raw coal is as follows:

TABLE II-1

| COAL ANALYSIS | |
| --- | --- |
| Proximate | |
| Moisture | 35.0% |
| Ash | 6.0% |
| Volatile Matter | 28.3% |
| Fixed Carbon | 30.7% |
| Total | 100.0% |
| Ultimate | |
| Carbon | 43.21% |
| *Hydrogen | 7.54% |
| †*Oxygen | 41.86% |
| Ash | 6.02% |
| Sulfur | 0.86% |
| Nitrogen | 0.51% |
| Total | 100.00% |

Heating Valve - 7410 Btu/lb
*The Hydrogen and Oxygen values include water in free moisture associated with the sample.
†Oxygen percentage figured by difference.

This second test run was a batch process conducted under the following operating conditions:

TABLE II-2

| OPERATING CONDITIONS | |
| --- | --- |
| Pressure | 500 psi |
| Peak Temperature | 1020° F. |
| Oxidant | pure $O_2$ |
| Oxidant Inlet Flux | 115 Lbs/ft$^2$ hr |
| Particle Size | ⅛ inch minus |

The following Tables II-3, II-4, II-5, and II-6, show the analyses of the processed char, the gaseous product, a material balance and an energy balance which resulted from this second test run.

TABLE II-3

| CHAR ANALYSIS (Weight %) | |
| --- | --- |
| Proximate | |
| Moisture | 5.2% |
| Ash | 16.2% |
| Volatile Matter | 15.0% |
| Fixed Carbon | 63.6% |
| Total | 100.0% |
| Ultimate | |
| Carbon | 71.66% |
| *Hydrogen | 4.03% |
| †*Oxygen | 6.30% |
| Ash | 16.24% |
| Sulfur | 1.16% |
| Nitrogen | 0.61% |
| Total | 100.00% |

Heating Valve - 11,290 Btu/lb
*The Hydrogen and Oxygen valves include water in free moisture associated with the sample.
†Oxygen percentage figured by difference.

TABLE II-4

GAS ANALYSIS (Mole %)

| | |
|---|---|
| $H_2$ | 30.8% |
| CO | 16.6% |
| $CO_2$ | 36.1% |
| $CH_4$ | 13.9% |
| *$C_2H_6$ | 1.2% |
| †$C_3H_8$ | 1.4% |
| Total | 100.0% |

Heating Valve - 350 HHV
*Ethylene is included with Ethane
†Any Propylene and Butane were included with Propane.

TABLE II-5

MATERIAL BALANCE

| | Entering (Lbs) | Leaving (Lbs) | % Difference |
|---|---|---|---|
| Proximate | | | |
| Coal/Char | 42.222 | 15.013 | |
| Gas | 7.329 | 21.280 | |
| Liquid | 0.000 | 14.222 | |
| Total | 49.551 | 50.515 | +1.9% |
| Ultimate | | | |
| Carbon | 18.245 | 18.485 | +1.3% |
| Hydrogen | 3.183 | 3.366 | +5.8% |
| Oxygen | 25.002 | 25.990 | +3.9% |

TABLE II-6

ENERGY BALANCE (Btu's)

| | |
|---|---|
| Entering | |
| Heat of Combustion (Coal) | 312,865.0 |
| Leaving | |
| Heat of combustion (Char) | 169,497.0 |
| Sensible Heat in Char | 5,602.0 |
| Heating Value of Gas | 103,530.0 |
| Sensible Heat in Gas | 4,697.0 |
| Sensible & Latent Heat of Liquids | 21,688.0 |
| Net Heat Loss | 7,851.0 |
| % Heat Loss | 2.5% |

EXAMPLE III

A subbituminous coal of the WyoDak type was treated with a batch process. An analysis of the raw coal is as follows:

TABLE III-1

COAL ANALYSIS

| | |
|---|---|
| Proximate | |
| Moisture | 30.1% |
| Ash | 6.1% |
| Volatile Matter | 32.4% |
| Fixed Carbon | 31.4% |
| Total | 100.0% |
| Ultimate | |
| Carbon | 47.27% |
| *Hydrogen | 6.75% |
| †*Oxygen | 38.33% |
| Ash | 6.12% |
| Sulfur | 0.97% |
| Nitrogen | 0.56% |
| Total | 100.00% |

Heating Valve - 8100 Btu/lb
*The Hydrogen and Oxygen values include water in free moisture associated with the sample.
†Oxygen percentage figured by difference.

This third test run was a batch process conducted under the following operating conditions:

TABLE III-2

OPERATING CONDITIONS

| | |
|---|---|
| Pressure | 500 psi |
| Peak Temperature | 1090° F. |
| Oxidant | pure $O_2$ |
| Oxidant Inlet Flux | 115 Lbs/ft² hr |
| Particle Size | ⅛ inch to ¼ inch |

The following Tables III-3, III-4, III-5, and III-6 show the analyses of the processed char, the gaseous product, a material balance and an energy balance which resulted from this third test run.

TABLE III-3

CHAR ANALYSIS (Weight %)

| | |
|---|---|
| Proximate | |
| Moisture | 2.9% |
| Ash | 11.4% |
| Volatile Matter | 19.8% |
| Fixed Carbon | 65.9% |
| Total | 100.0% |
| Ultimate | |
| Carbon | 74.90% |
| *Hydrogen | 3.64% |
| †*Oxygen | 7.85% |
| Ash | 11.36% |
| Sulfur | 1.32% |
| Nitrogen | 0.93% |
| Total | 100.00% |

Heating Valve - 12,240 Btu/lb
*The Hydrogen and Oxygen valves included water in free moisture associated with the sample.
†Oxygen percentage figured by difference.

TABLE III-4

GAS ANALYSIS (Mole %)

| | |
|---|---|
| $H_2$ | 6.6% |
| CO | 20.7% |
| $CO_2$ | 52.2% |
| $CH_4$ | 17.2% |
| *$C_2H_6$ | 2.5% |
| †$C_3H_8$ | 0.8% |
| Total | 100.00% |

Heating Valve - 337 HHV
*Ethylene is included with Ethane
†Any Propylene and Butane were included with Propane.

TABLE III-5

MATERIAL BALANCE

| | Entering (Lbs) | Leaving (Lbs) | % Differences |
|---|---|---|---|
| Proximate | | | |
| Coal/Char | 42.498 | 21.861 | |
| Gas | 4.998 | 11.570 | |
| Liquid | 0.000 | 14.297 | |
| Total | 47.496 | 47.728 | +0.5% |
| Ultimate | | | |
| Carbon | 20.089 | 20.531 | +2.2% |
| Hydrogen | 2.869 | 2.757 | −3.9% |
| Oxygen | 21.288 | 21.462 | +0.8% |

TABLE III-6

ENERGY BALANCE (Btu's)

| | |
|---|---|
| Entering | |
| Heat of Combustion (Coal) | 344,234.0 |
| Leaving | |
| Heat of Combustion (Char) | 267,579.0 |
| Sensible Heat in Char | 9,229.0 |
| Heating Value of Gas | 39,913.0 |
| Sensible Heat in Gas | 2,813.0 |

TABLE III-6-continued

| ENERGY BALANCE (Btu's) | |
|---|---|
| Sensible & Latent Heat of Liquids | 21,745.0 |
| Net Heat Loss | 2,955.0 |
| % Heat Loss | 0.86% |

EXAMPLE IV

A coal from the Rosebud Mine of Hanna, Wyo., variously classified as a high volatile bituminous coal or a subbituminous coal was treated with a batch process. An analysis of the raw coal is as follows

TABLE IV-1

| COAL ANALYSIS | |
|---|---|
| Proximate | |
| Moisture | 10.5% |
| Ash | 7.2% |
| Volatile Matter | 38.3% |
| Fixed Carbon | 44.0% |
| Total | 100.0% |
| Ultimate | |
| Carbon | 63.70% |
| *Hydrogen | 5.91% |
| †*Oxygen | 21.51% |
| Ash | 7.18% |
| Sulfur | 0.68% |
| Nitrogen | 1.02% |
| Total | 100.00% |

Heating Valve - 11,170 Btu/lb
*The Hydrogen and Oxygen values include water in free moisture associated with the sample.
†Oxygen percentage figured by difference.

This fourth test run was a batch process conducted under the following operating conditions:

TABLE IV-2

| OPERATING CONDITIONS | |
|---|---|
| Pressure | 500 psig |
| Peak Temperature | 1340° F. |
| Oxidant | pure $O_2$ |
| Oxidant Inlet Flux | 115 Lbs/ft$^2$ hr |
| Particle Size | ⅛ inch minus |

The following Tables IV-3, IV-4, IV-5, and IV-6 show the analyses of the processed char, the gaseous product, a material balance and an energy balance which resulted from this fourth test run.

TABLE IV-3

| CHAR ANALYSIS (Weight %) | |
|---|---|
| Proximate | |
| Moisture | 4.7% |
| Ash | 10.1% |
| Volatile Matter | 30.1% |
| Fixed Carbon | 55.1% |
| Total | 100.0% |
| Ultimate | |
| Carbon | 70.57% |
| *Hydrogen | 4.45% |
| †*Oxygen | 12.82% |
| Ash | 10.10% |
| Sulfur | 0.84% |
| Nitrogen | 1.22% |
| Total | 100.00% |

Heating Valve - 11,810 Btu/lb
*The Hydrogen and Oxygen valves include water in free moisture associated with the sample.
†Oxygen percentage figured by difference.

TABLE IV-4

| GAS ANALYSIS (Mole %) | |
|---|---|
| $H_2$ | 14.4% |
| CO | 16.0% |
| $CO_2$ | 50.5% |
| $CH_4$ | 13.6% |
| *$C_2H_6$ | 3.3% |
| †$C_3H_8$ | 2.2% |
| Total | 100.0% |

Heating Valve - 350 HHV
*Ethylene is included with Ethane
†Any Propylene and Butane were included with Propane.

TABLE IV-5

| MATERIAL BALANCE | | | |
|---|---|---|---|
| | Entering (Lbs) | Leaving (Lbs) | % Difference |
| Proximate | | | |
| Coal/Char | 40.679 | 31.552 | |
| Gas | 3.286 | 4.821 | |
| Liquid | 0.000 | 6.795 | |
| Total | 43.965 | 43.168 | −1.8% |
| Ultimate | | | |
| Carbon | 25.913 | 24.000 | −7.4% |
| Hydrogen | 2.404 | 2.301 | −4.3% |
| Oxygen | 12.036 | 12.984 | +7.3% |

TABLE IV-6

| ENERGY BALANCE (Btu's) | |
|---|---|
| Entering | |
| Heat of Combustion (Coal) | 454,384 |
| Leaving | |
| Heat of combustion (Char) | 376,629 |
| Sensible Heat in Char | 19,460 |
| Heating Value of Gas | 18,911 |
| Sensible Heat in Gas | 1,553 |
| Sensible & Latent Heat of Liquids | 11,526 |
| Net Heat Loss | 26,305 |
| % Heat Loss | 5.8% |

The foregoing is considered as illustrative only of the principles of the invention. Since numerous modifications and changes will readily occur to those skilled in the art, it is not desired to limit the invention to the exact construction, operation and examples shown and described herein. Accordingly, all suitable modifications and equivalents may be resorted to falling within the scope of the invention as defined by the claims which follow.

The embodiment in which an exclusive privilege is claimed is:

1. A method of drying and gasifying a solid, carbonaceous feed material, comprising the steps of:
   placing the feed material in an enclosed chamber;
   igniting the solid feed material in the chamber to create a combustion zone with a combustion front that advances through the feed material to achieve a thermal restructuring of said solid feed material;
   flowing an oxidant through said feed material in the chamber in a direction opposite to the advancing movement of the combustion front in the feed material; and
   controlling the system temperature in the chamber and the velocity of the combustion front by varying the oxygen purity of the oxidant in such a manner that increasing the oxygen purity of the oxidant decreases the system temperature and increases the velocity of combustion front, and decreasing the oxygen purity of the oxidant increases the system temperature and decreases the velocity of the combustion front.

2. The method of claim 1, wherein the solid feed material includes a solid fossil fuel.

3. The method of claim 1, wherein the solid feed material includes solid biological wastes.

4. The method of claim 1, where the solid feed material is a soil contaminated with volatile toxins.

5. The method of claim 1, wherein the solid feed material is an adsorbent bed contaminated with volatile toxins.

6. The method of claim 1, where the oxidant is air.

7. The method of claim 1, where the oxidant is oxygen enriched air.

8. The method of claim 1, where the oxidant is pure oxygen.

9. The method of claim 1, including the step of partially drying the solid fossil fuel prior to combustion.

10. The method of claim 1, including the step of adding a catalyst to the solid feed material.

11. The method of claim 1, including the step of maintaining including the step of maintaining the oxidant gas flow pressure in the chamber in the range of about 0 psi to 5,000 psi.

12. The method of claim 11, including the step of maintaining the oxidant gas pressure in the chamber in the range of about 0 psia to 600 psia.

13. The method of claim 1, including the step of maintaining the temperature of combustion in the range of about 400° F. to 3,000° F.

14. The method of claim 13, including the step of maintaining the temperature of the combustion in the range of about 600° F. to 1,500° F.

15. The method of claim 12, where the temperature of combustion is controlled by the constituents of the solid feed material, the initial bed temperature, the type of oxidant, the quantity of oxidant, the oxidant flow rate, and the oxidant pressure.

16. The method of claim 14, where the temperature of combustion is additionally controlled by the addition of a catalyst.

17. The method of claim of claim 1, where a level of combustion of the solid feed material is in the range of about 5% to 100%, said level of combustion being controlled by adjustment of the type of oxidant, the constituents of the solid feed material, the type of oxidant, the quantity of oxidant, the oxidant flow rate, the oxidant pressure and the combustion chamber.

18. Apparatus for drying and gasifying organic materials, comprising:
an elongated container forming an enclosed chamber;
feed material inlet means at one end of said container for feeding said organic materials into said chamber;
oxidant inlet means connected to said chamber at the same end of said chamber as said feed material inlet means for introducing an oxidant gas into said chamber;
solid material outlet means at the end of said container that is opposite said feed material inlet means for removing oxidized organic solid materials form said chamber;
gas removal outlet means connected to said chamber a longitudinally spaced distance from said oxidant inlet means and adjacent said solid material outlet means such that a substantial quantity of said organic material can be contained in said container between said oxidant inlet means and said gas removal outlet means;
igniting means positioned in said chamber for igniting organic material in said chamber in a position that can create a combustion zone with a combustion front in the organic material between said oxidant inlet means and said gas removal outlet means;
feed means for moving said organic material through said chamber in a direction opposite the direction in which said combustion front advances through said organic material, wherein said feed means is coordinated in speed with the flow of oxidant gas into said chamber in such a manner that the combustion front effectively remains stationary in the chamber as the organic material advances through the chamber and the oxidized organic material is removed from the chamber.

19. The apparatus of claim 18, wherein said container is an elongated cylindrical vessel and said feed means includes an auger extending partially through said cylindrical vessel with its axis of rotation oriented parallel to the longitudinal axis of said cylindrical vessel.

20. The apparatus of claim 18, wherein said container is capable of holding an elevated pressure therein and said oxidant is capable of flowing into said chamber under sufficient pressure to create a net flow of oxidant and combustion gas products through said container in a direction from the oxidant inlet means, through said combustion front in said organic material, and to said gas removal outlet means.

21. A method of drying and gasifying a solid carbonaceous feed material comprising the steps of:
placing the feed material in an enclosed chamber that is capable of being pressurized;
igniting the solid feed material in the chamber to create a combustion zone with a combustion front that advances through the feed material to achieve a thermal restructuring of said solid feed material;
flowing an oxidant through said feed material in the chamber in a direction opposite the advancing movement of the combustion front in the feed material; and
controlling the system temperature in the chamber and the velocity of the combustion front by varying the pressure in the chamber in such a manner that increasing the pressure decreases the system temperature and increases the velocity of the combustion front, and decreasing the pressure increases the system temperature and decreases the velocity of the combustion front.

22. The method of claim 21, where the solid feed material includes a solid fossil fuel.

23. The method of claim 21, where the solid feed material includes solid biological wastes.

24. The method of claim 21, where the solid feed material is a soil contaminated with volatile toxins.

25. The method of claim 21, where the solid feed material is an adsorbent bed contaminated with volatile toxins.

26. The method of claim 21, including the step of adding a catalyst to the solid feed material.

27. A method of drying and gasifying a solid carbonaceous feed material comprising the steps of:
placing the feed material in an enclosed chamber;
igniting the solid feed material in the chamber to create a combustion front that advances through the feed material to achieve a thermal restructuring of said solid feed material;

flowing an oxidant through said feed material in the chamber in a direction opposite to the advancing movement of the combustion front in the feed material; and controlling the system temperature in the chamber and the velocity of combustion front by varying the moisture content of the feed material in such a manner that decreasing the moisture content of the feed material decreases the system temperature and increases the velocity of the combustion front, and increasing the moisture content of the feed material increases the system temperature and decreases the velocity of the combustion front.

28. The method of claim 27, wherein the solid feed material includes a solid fossil fuel.

29. The method of claim 27, wherein the solid feed material includes solid biological wastes.

30. The method of claim 27, where the solid feed material is at soil contaminated with volatile toxins.

31. The method of claim 27, where the solid feed material is an adsorbent bed contaminated with volatile toxins.

32. The method of claim 27, including the step of adding a catalyst to the solid feed material.

33. In a method of drying and gasifying a solid carbonaceous feed material wherein the feed material is placed in a chamber and ignited to create a combustion zone with a combustion front that advances through the carbonaceous feed material to achieve a thermal restructuring of the carbonaceous feed material and the production of such gaseous and liquid by-product constituents as hydrocarbons, oil, methane, carbon monoxide, hydrogen, and carbon dioxide, the improvement comprising the steps of:

flowing an oxidant material containing oxygen through said feed material in a direction that is substantially opposite the direction that the combustion front advances through the feed material; and controlling proportional production of the by-product constituents by increasing the oxygen purity of the oxidant and thereby increasing the velocity of the combustion front and lowering system temperature in the chamber to favor increased production of oil, hydrocarbons, and methane and decreased production of carbon monoxide, hydrogen, and carbon diode, or by decreasing the oxygen purity of the oxidant and thereby decreasing the velocity of the combustion front and lowering system temperature in the chamber to favor decreased production of oil, hydrocarbons, and methane and increased production of carbon monoxide, hydrogen, and carbon dioxide.

34. In a method of drying and gasifying a solid carbonaceous feed material wherein the feed material is placed in a chamber and ignited to create a combustion zone with a combustion front that advances through the carbonaceous feed material to achieve a thermal restructuring of the carbonaceous feed material and the production of such gaseous and liquid by-product constituents as hydrocarbons, oil, methane, carbon monoxide, hydrogen, and carbon dioxide, the improvement comprising the steps of:

flowing an oxidant material containing oxygen through said feed material in a direction that is substantially opposite the direction that the combustion front advances through the feed material; and controlling proportional production of the by-product constituents by increasing pressure in the chamber and thereby increasing the velocity of the combustion front and lower system temperature in the chamber to favor increased production of oil, hydrocarbons, and methane and decreased production of carbon monoxide, hydrogen, and carbon dioxide, or by decreasing pressure in the chamber and thereby decreasing the velocity of the combustion front and lowering system temperature in the chamber to favor decreased production of oil, hydrocarbons, and methane and increased production of carbon monoxide, hydrogen, and carbon dioxide.

35. In a method of drying and gasifying a solid carbonaceous feed material wherein the feed material is placed in a chamber and ignited to create a combustion zone with a combustion front that advances through the carbonaceous feed material to achieve a thermal restructuring of the carbonaceous feed material and the production of such gaseous and liquid by-product constituents as hydrocarbons, oil, methane, carbon monoxide, hydrogen, and carbon dioxide, the improvement comprising the steps of:

flowing an oxidant material containing oxygen through said feed material in a direction that is substantially opposite the direction that the combustion front advances through the feed material; and controlling proportional production of the by-product constituents by decreasing the moisture content of the feed material and thereby increasing the velocity of the combustion front and lowering system temperature in the chamber to favor increased production of oil, hydrocarbons, and methane and decreased production of carbon monoxide, hydrogen, and carbon dioxide, or by increasing the moisture content of the feed material and thereby decreasing the velocity of the combustion front and lowering system temperature in the chamber to favor decreased production of oil, hydrocarbons, and methane and increased production of carbon monoxide, hydrogen, and carbon dioxide.

36. In a method of drying and gasifying a solid carbonaceous feed material wherein the feed material is placed in a chamber and ignited to create a combustion zone with a combustion front that advances through the carbonaceous feed material to achieve a thermal restructuring of the carbonaceous feed material and the production of such gaseous and liquid by-product constituents as hydrocarbons, oil, methane, carbon monoxide, hydrogen, and carbon dioxide, the improvement comprising the steps of:

flowing an oxidant material containing oxygen through said feed material in a direction that is substantially opposite the direction that the combustion front advances through the feed material; and controlling proportional production of the by product constituents by increasing the velocity of the combustion front and lowering system temperature in the chamber to favor increased production of oil, hydrocarbons, and methane and decreased production of carbon monoxide, hydrogen, and carbon dioxide, or by decreasing the velocity of the combustion front and lowering system temperature in the chamber to favor decreased production of oil, hydrocarbons, and methane and increased production of carbon monoxide, hydrogen, and carbon dioxide.

37. The improvement of claim 36, including the step of increasing the oxygen purity of the oxidant to increase the velocity of the combustion front and decrease the system temperature.

38. The improvement of claim 36, including the step of decreasing the oxygen purity of the oxidant to decrease the velocity of the combustion front and increase the system temperature.

39. The improvement of claim 36, including the step of increasing the pressure in the chamber to increase the velocity of the combustion front and decrease the system temperature.

40. The improvement of claim 36, including the step of decreasing the pressure in the chamber to decrease the velocity of the combustion front and increase the system temperature.

41. The improvement of claim 36, including the step of decreasing the moisture content of the feed material to increase the velocity of the combustion front and crease the system temperature.

42. The improvement of claim 36, including the step of increasing the moisture content of the feed material to decrease the velocity of the combustion front and increase the system temperature.

43. In a method of drying and gasifying a solid carbonaceous feed material wherein the feed material is placed in a chamber and ignited to create a combustion zone with a combustion front that advances through the carbonaceous feed material to achieve a thermal restructuring of the carbonaceous feed material and the production of methane and hydrocarbon by-products, the improvement comprising the steps of:

flowing an oxidant material containing oxygen through said feed material in a direction that is substantially opposite the direction that the combustion front advances through the feed material; and enhancing the production of methane and hydrocarbon by-products by increasing the velocity of the combustion front and decreasing the system temperature in the chamber.

44. The improvement of claim 43, including the step of increasing the oxygen purity of the oxidant material to increase the velocity of the combustion front and decrease the system temperatures.

45. The improvement of claim 43, including the step of increasing the pressure in the chamber to increase the velocity of the combustion front and decrease the system temperature.

46. The improvement of claim 43, including the step of decreasing moisture content of the fed material to increase the velocity of the combustion front and lower the system temperature.

* * * * *

UNITED STATES PATENT AND TRADEMARK OFFICE
CERTIFICATE OF CORRECTION

PATENT NO. : 4,967,673

DATED : November 6, 1990

INVENTOR(S) : Robert D. Gunn

It is certified that error appears in the above-identified patent and that said Letters Patent is hereby corrected as shown below:

Column 1, line 63, change "byproduct" to --by-product--.

Column 3, line 38, after "chamber" insert --,--.

Column 6, line 17, change "suet" to --such--.

Column 7, line 55, after "pressure" delete --flow rate--.

Column 9, line 20, change ";.s" to --As--.

Column 11, line 36, after "I-5" insert --show the--.

Column 22, line 25, change "fed" to --feed--.

Signed and Sealed this

Seventh Day of April, 1992

Attest:

HARRY F. MANBECK, JR.

Attesting Officer

Commissioner of Patents and Trademarks